United States Patent
Jimenez

(10) Patent No.: US 6,237,198 B1
(45) Date of Patent: May 29, 2001

(54) SAFE CORD COVER

(75) Inventor: Carlos Jimenez, 3565 Evening Canyon Rd., Oceanside, CA (US) 92056

(73) Assignee: Carlos Jimenez, Oceanside, CA (US)

( * ) Notice: Subject to any disclaimer, the term of this patent is extended or adjusted under 35 U.S.C. 154(b) by 0 days.

(21) Appl. No.: 09/272,418

(22) Filed: Mar. 19, 1999

Related U.S. Application Data

(60) Provisional application No. 60/112,764, filed on Dec. 17, 1998.

(51) Int. Cl.[7] ............................................ A44B 21/00
(52) U.S. Cl. .............................. 24/306; 428/100; 24/442
(58) Field of Search .................. 24/306, 442; 174/117 F, 174/115, 117 R; 104/275; 428/100

(56) References Cited

U.S. PATENT DOCUMENTS

| | | | |
|---|---|---|---|
| 3,308,490 | * 3/1967 | Cacioppo | 428/100 X |
| 3,403,429 | * 10/1968 | Smith | 24/306 |
| 4,099,269 | * 7/1978 | Porner | 428/100 X |
| 4,340,633 | * 7/1982 | Robbins, Jr. | 429/100 X |
| 4,858,249 | * 8/1989 | Stewart | 24/306 X |
| 4,931,344 | * 6/1990 | Ogawa et al. | 428/100 |
| 5,081,748 | * 1/1992 | Eberle | 24/306 X |
| 5,178,923 | * 1/1993 | Andrieu et al. | 428/100 X |
| 5,520,983 | * 5/1996 | Yamamoto et al. | 428/100 |

* cited by examiner

Primary Examiner—Robert J. Sandy

(57) ABSTRACT

A safe cord cover for securing electrical cords to looped carpeted flooring, the cover referred to by the inventor as "SAFCORD" consists of a strip of fabric material such as NYLON, CORDURA, having substantially two parallel longitudinal edges; two parallel strips of male hook latch material; each one of the strips of the hook latch material separated by a space from one another and sewn onto the strip of material having the longitudinal edges and along each of the two longitudinal edges of the strip of material; and the space between the two strips of hook latch material are without hook latch material and form a channel for accommodating electrical cords.

More specifically, the fabric strip made of material with male hook latch material is applied independently, to loop carpet floors without use of the female hook latch material and lays flat over electrical cords, securing electrical cords to carpet to protect against trip hazards and protect carpet and cords from adhesive residue, as well as maintaining electric cords neatly arranged.

2 Claims, 3 Drawing Sheets

SAFE CORD COVER (Referred to as Safe Cord Cover on the Provisional Application Filing, application Ser. No. 60/112,764, filing Date, Dec. 17, 1998).

BACKGROUND OF THE INVENTION

This invention relates to a textile cloth-like strip of material such as NYLON CORDURA, having substantially two parallel longitudinal edges; two strips of a male hook latch material, each one of the strips of the male hook latch material being separated by a space from one another and sewn onto the textile cloth-like strip of material having the longitudinal edges of the strip of fabric material and the space between the two strips of male hook latch material and form a channel for accommodating electrical cords. More specifically the textile cloth-like material with male hook latch material is applied independently, to loop carpet floors without the use of the female hook latch material and lays flat over electrical cords, securing electrical cords to carpet to protect against trip hazards and protect carpet and cords from adhesive residue from taping as well as maintaining electric cords neatly arranged.

SUMMARY OF THE INVENTION

In general, electrical cords on loop carpet floors are usually left unattended or are taped to carpeted floors to secure cords from being disconnected by being stepped on or tripped over. An objective of this invention is to eliminate trip hazards that result when electrical cords are present on walking surfaces of loop carpet floors by laying the textile cloth-like strip of material with male hook latch material flat over electrical cords on loop carpeted floors. Another objective of this invention is the protection of carpet assets and electrical cords from adhesive residue.

Unattended and unsecured electric cords on loop carpet floors present a potentially dangerous hazard. An important objective of this invention is to provide a means of securing electrical cords onto loop carpet floors and surfaces, eliminating the need of taping electric cords or placing barriers to warn against the danger of tripping hazards caused by electric cords. Prior to this invention methods for securing electric cords onto loop carpet floors and surfaces include taping or placing hazard warning barriers to warn against tripping hazards. Taping electric cords onto carpeted floors and surfaces causes deterioration of carpet assets, and produces unsightly and unhealthy adhesive residue on electric cords and carpets. Hazard barriers are often difficult to locate thereby deterring from identifying the trip hazard. This invention relates to a textile cloth-like strip of material having substantially two parallel longitudinal edges; two strips of a male hook latch material, each one of the strips of the male hook latch material being separated by a space from one another and sewn onto the strip of material having the longitudinal edges of the strip of material, and the space between the two strips of male hook latch material is without hook latch material and form a channel for accommodating electrical cords. More specifically the textile cloth-like strip of material with male hook latch material is applied directly and independently over electric cords on loop carpeted floors and surfaces, to protect against trip hazards and protect carpet and cords from adhesive residue from taping, as well as maintaining cords neatly arranged.

Still another important objective and advantage of this invention is that it provides a safe, clean, reusable method for securing electrical cords to loop carpet floors and surfaces, unlike the taping method that leaves adhesive residue on electric cords and carpeted floors and surfaces and causes inordinate costs associated with cleaning, and carpet asset replacement. Cleaning adhesive residue left by taping electric cords on carpets is labor intensive.

BRIEF DESCRIPTION OF THE DRAWINGS

The invention will be described and more fully understood from the accompanying drawings in which the invention is described in to itself and in its application.

DETAILED DESCRIPTION OF THE INVENTION

Figure 1:
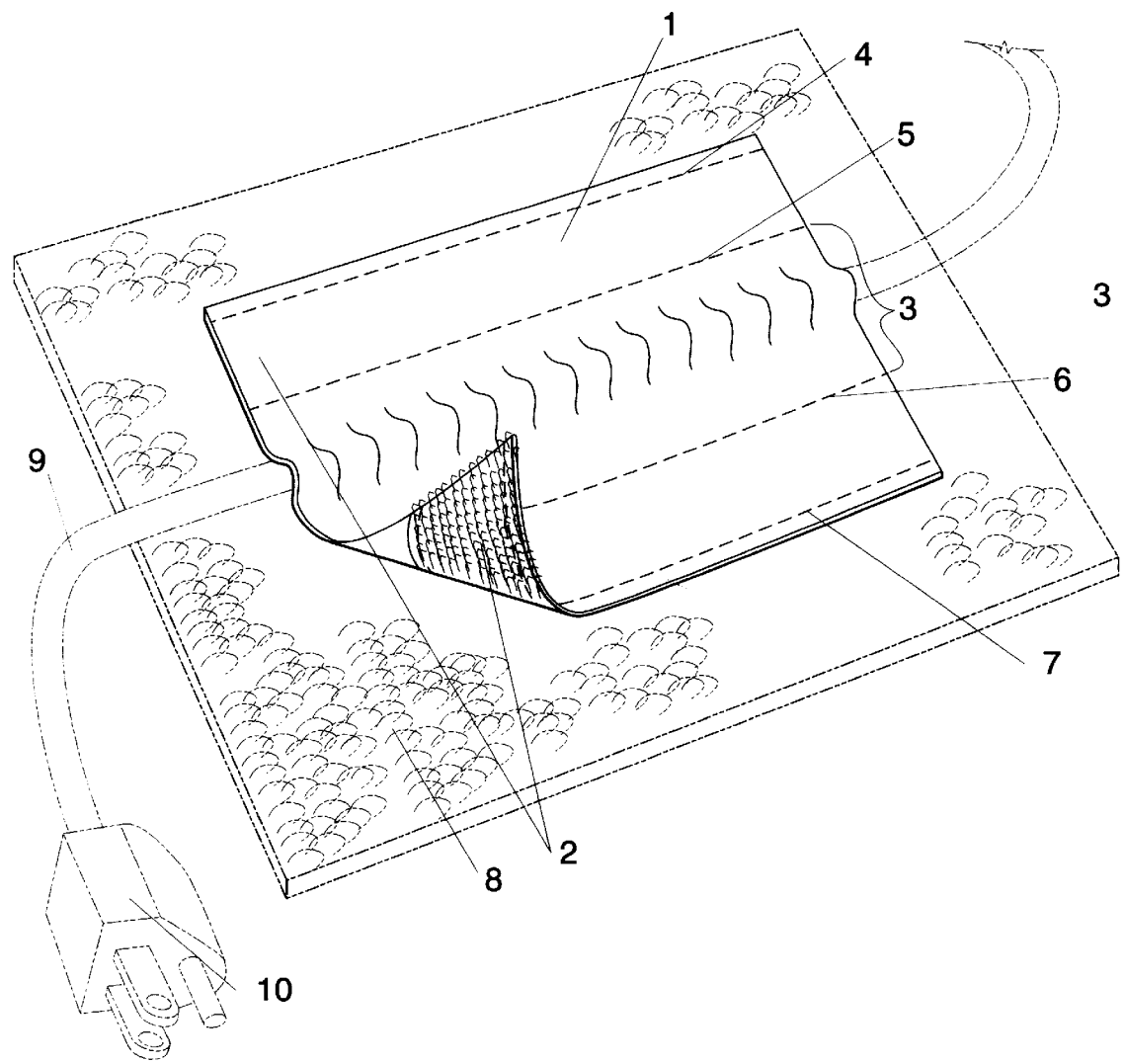
FIG. 1, a top view of the cord cover in use over an electric cord laying on loop carpet, where the male hook latch material becomes inter-engaged with the loop carpet to provide a cover for the electric cord. One corner of the strip of fabric material is folded back to better show its construction.

Referring to the drawings beginning with FIG. 1, the invention in shown in use, and describes the cord cover textile cloth-like strip of material 1, with two parallel strips of male hook latch material 2, each of the strips of the male hook latch material being separated by a space 3, from one another and sewn at 4, 5, 6, and 7 onto the strip of material having the longitudinal edges and along each of the two longitudinal edges of the strip of material; and the space 3, between the two strips of hook latch material are without hook latch material and form a channel for accommodating the electric cords. The textile cloth-like strip of material 1, with two parallel strips of male hook latch material 2, having the longitudinal edges and along each of the two longitudinal edges of the strip of material; and the space 3, between the two strips of male hook latch is without hook latch material and form a channel 3, inter-engaging with the carpet loop material 8, to accommodate the electric cord 9. The electric cord in the drawing has a power plug 10, to enable showing the cord 9, as an electric cord.

Figure 2:
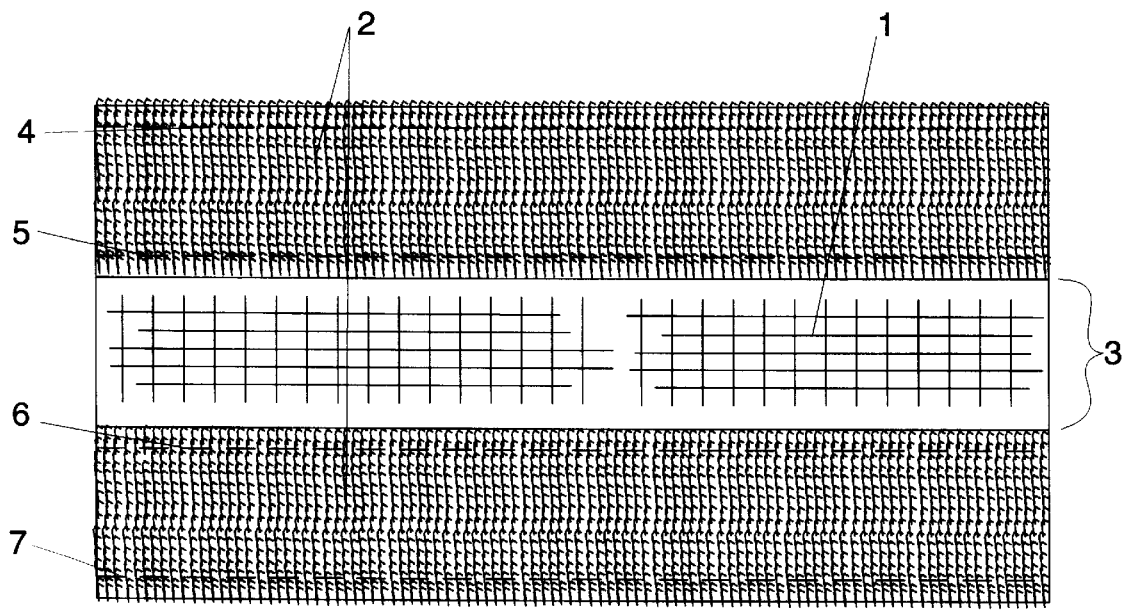
FIG. 2, is a bottom view of the cord cover.

Illustrated in FIG. 2, is a bottom view of the textile cloth-like strip of material 1, shown with the two longitudinal edges; and the space without male hook latch material to form a channel 3, between the two strips of male hook latch material 2, and sewn at 4, 5, 6, and 7.

Figure 3:
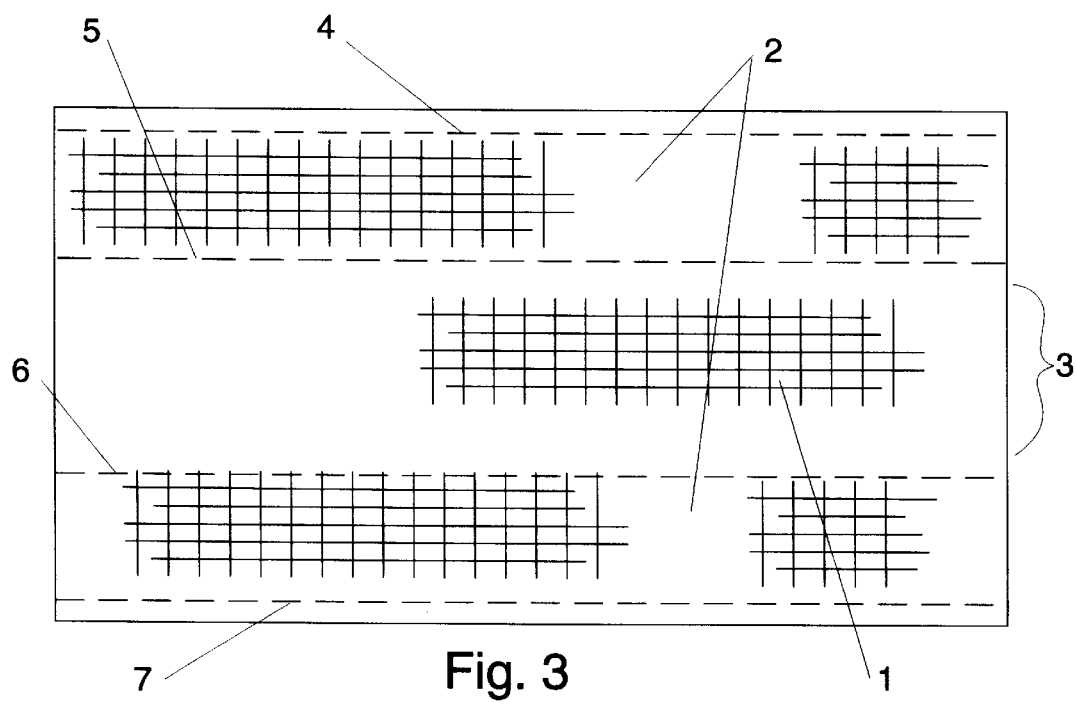
FIG. 3, is a top view of the cord cover.
Figure 4:
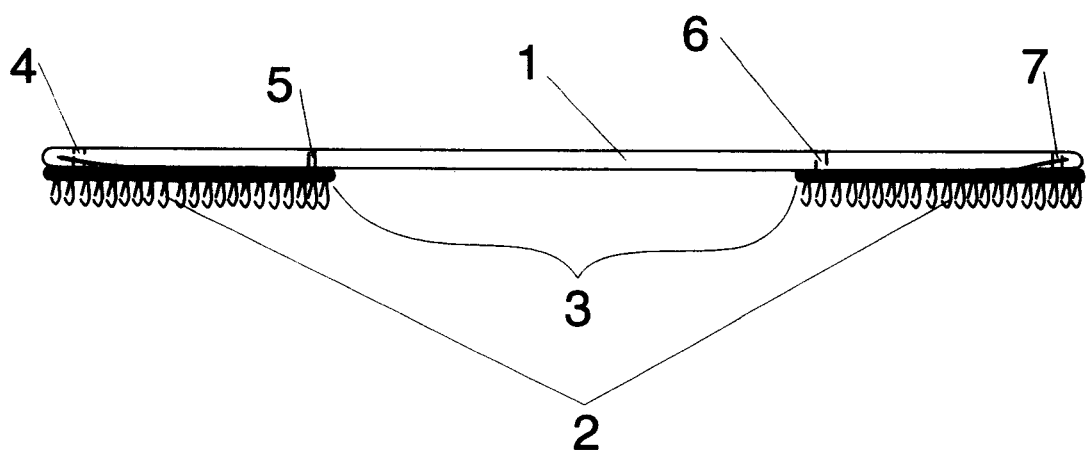
FIG. 4, is a an end view of the cord cover

Illustrated in FIG. 3, is a top view of the cord cover. The textile cloth-like strip of material 1, is shown with the two strips of hook latch material 2, and the space without male hook latch material to form a channel 3, and sewn at 4, 5, 6, and 7, on the bottom of the strip of material. As previously discussed, this invention relates to a strip of textile cloth-like material, having substantially two parallel longitudinal edges; two strips of a male hook latch material, each one of the strips of the male hook latch material being separated by a space from one another and sewn onto the strip of material having the longitudinal edges of the strip of material and the space between the two strips of male hook latch material are without hook latch material and form a channel for accommodating electrical cords.

What is claimed is:

1. A cord cover device for securing electrical cords to loop carpeted floors and surfaces, the device comprising:

a strip of material having a pair of substantially parallel edges disposed longitudinal to the cover device, and another pair of parallel edges disposed transverse to the cover device and substantially perpendicular to the longitudinal parallel edges; and two parallel strips of a male hook latch material having hook-shaped elements provided on each of the strips for securing onto a loop carpeted floor or surface, each one of the strips of the male hook latch material being separated from one another by a space and secured onto the strip of material along the pair of longitudinal parallel edges and extending to the pair of transverse parallel edges, the space defining a channel between the two strips of the male hook latch material and extending entirely between the pair of transverse parallel edges for accommodating electrical cords therein.

2. The cord cover according to claim number 1, wherein the two strips of male hook latch material are sewn onto the strip of material having the pairs of longitudinal parallel edges and transverse parallel edges.

* * * * *